July 6, 1948.  W. B. BARNES  2,444,691
CHANGE SPEED MECHANISM
Original Filed June 18, 1943  8 Sheets-Sheet 1

INVENTOR.
William B Barnes
BY W. P. Hahn
Atty

INVENTOR.
WILLIAM B. BARNES
BY W. P. Hahn
ATTORNEY

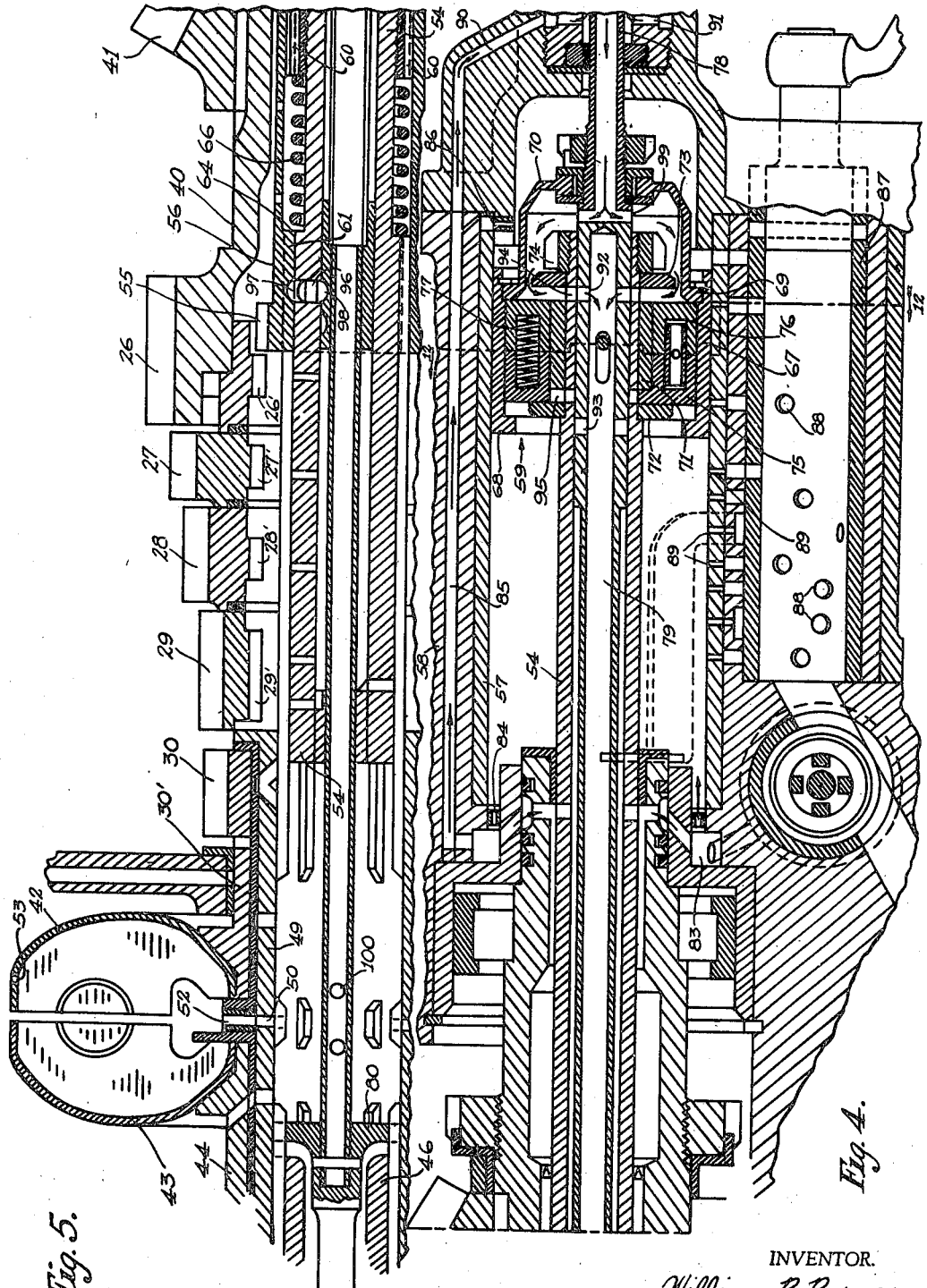

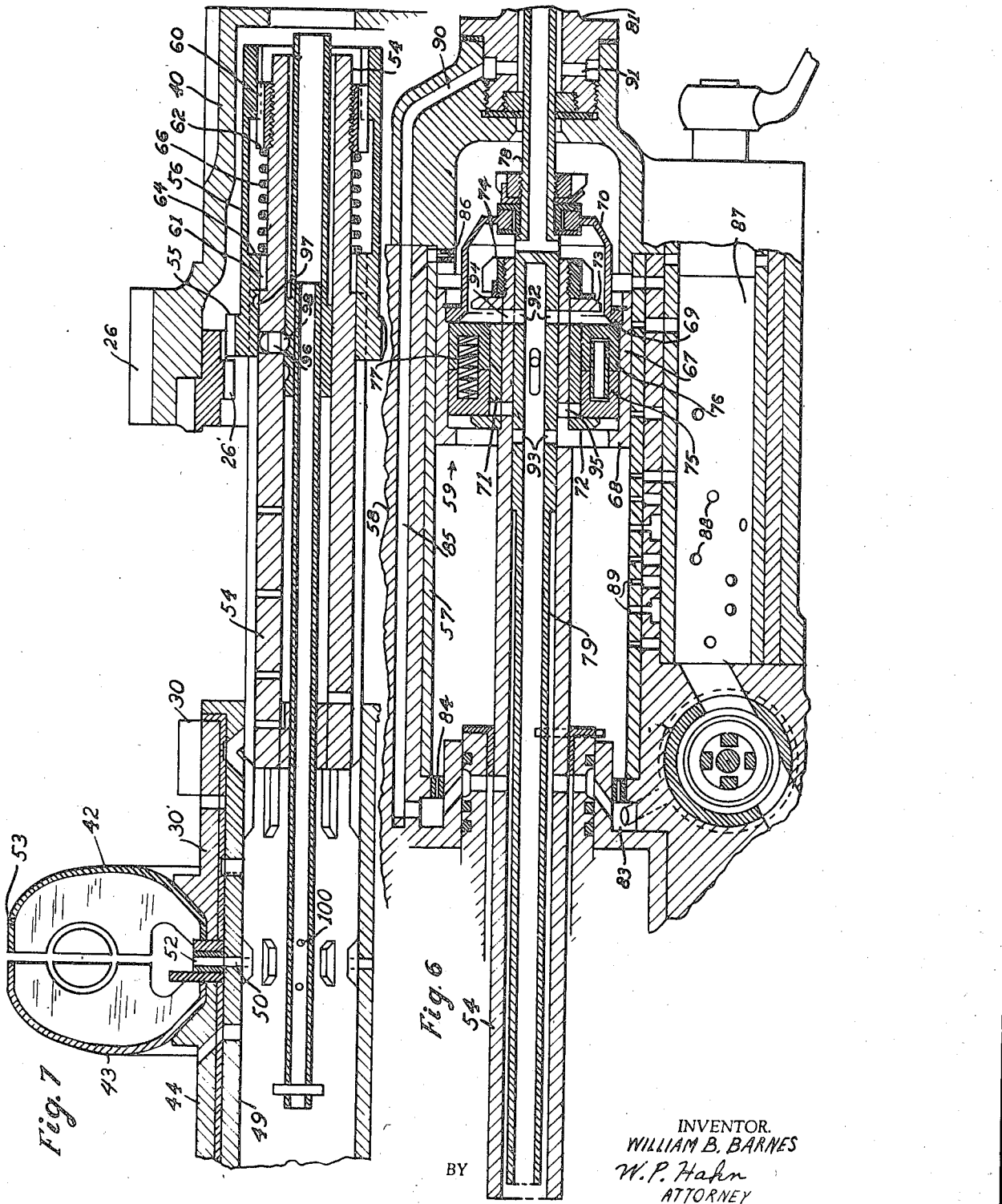

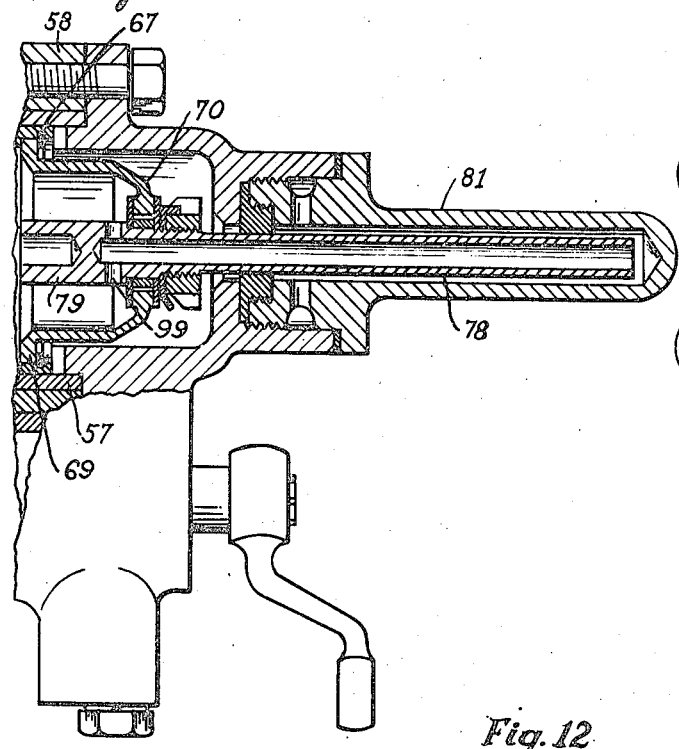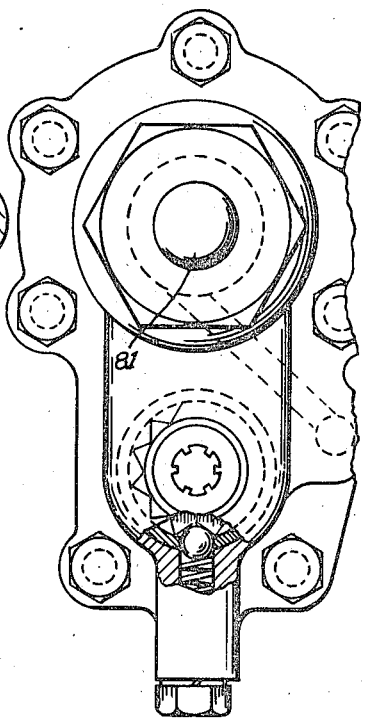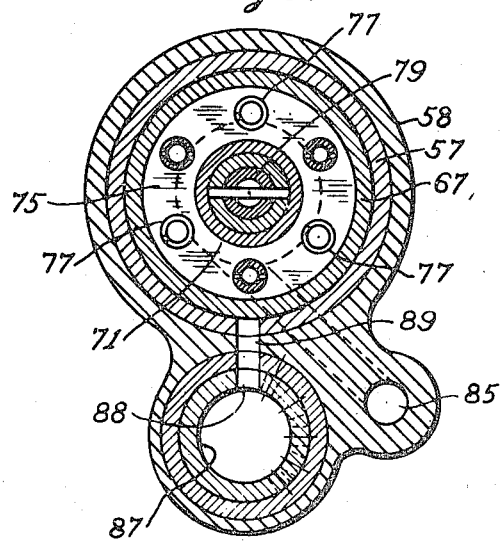

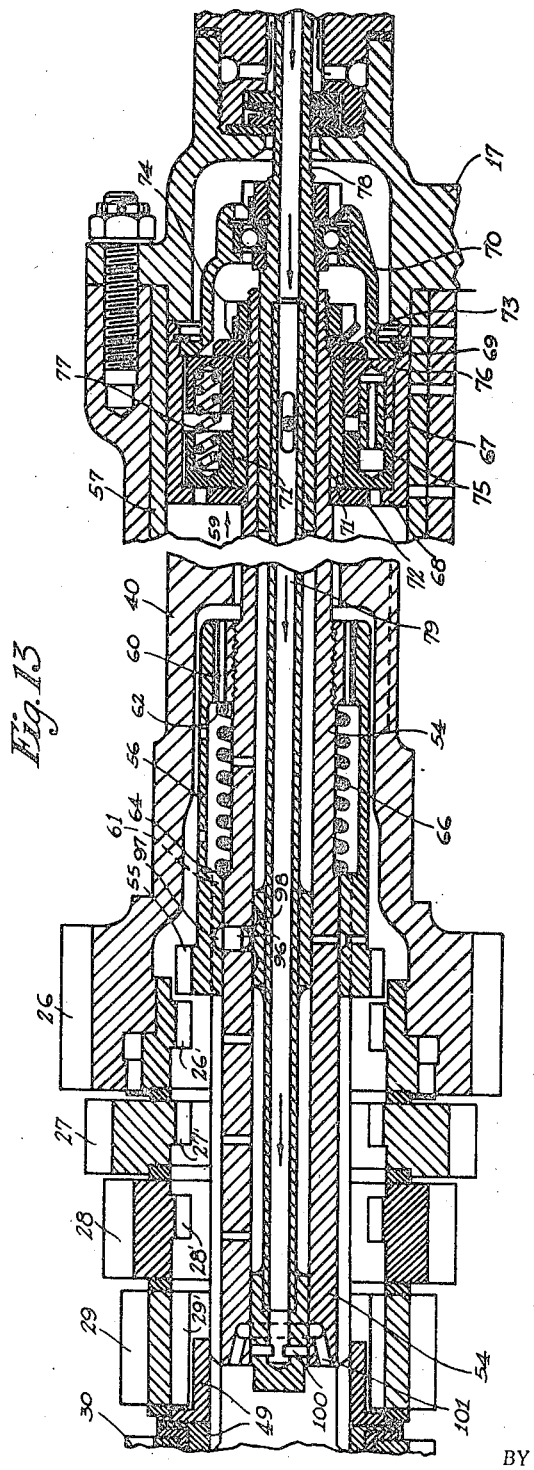
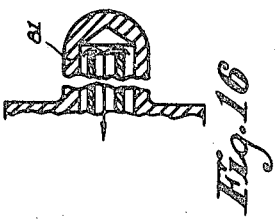
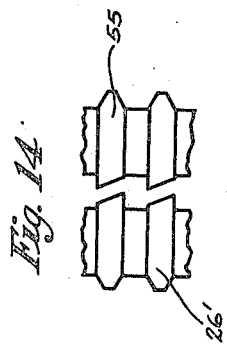

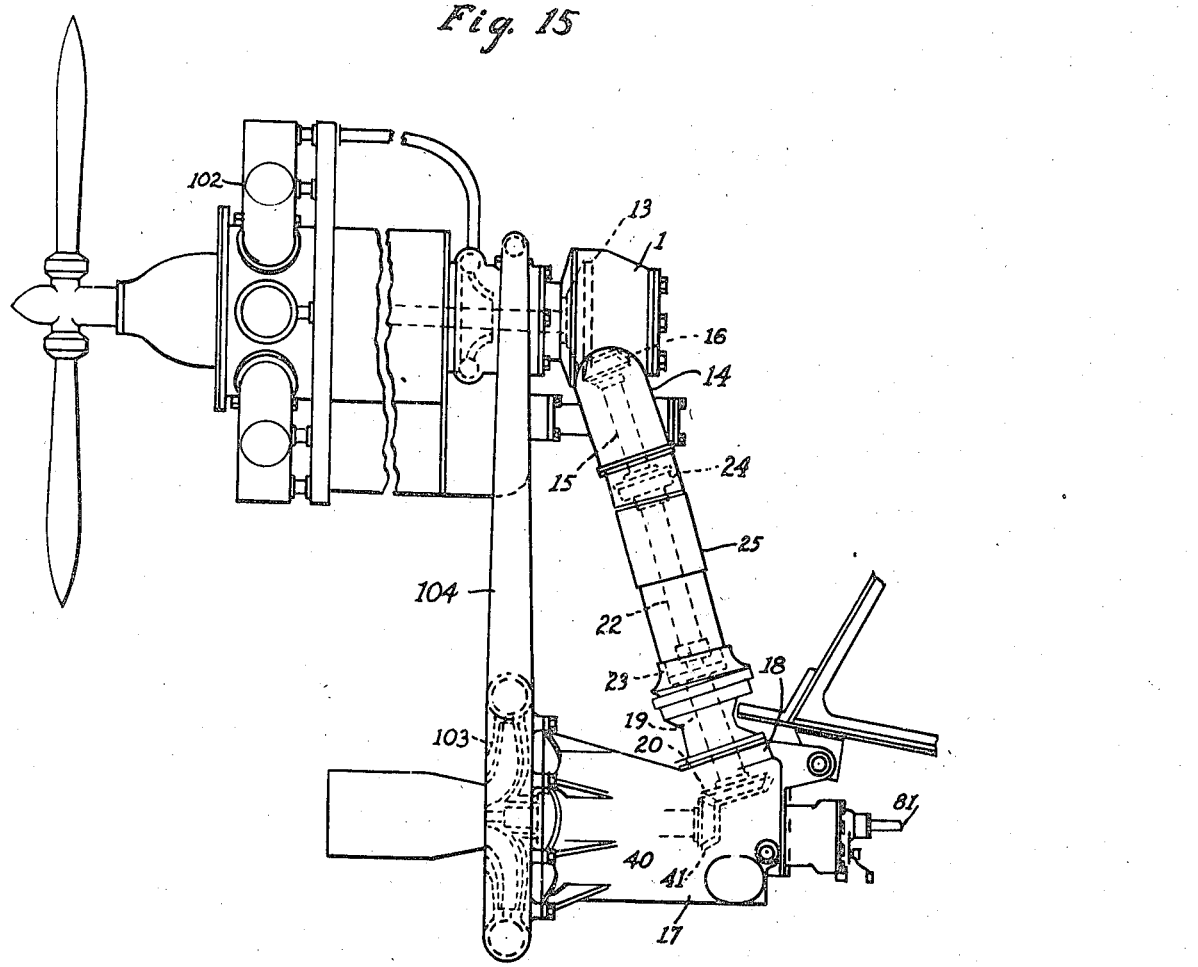

Patented July 6, 1948

2,444,691

UNITED STATES PATENT OFFICE 2,444,691

CHANGE-SPEED MECHANISM

William B. Barnes, Muncie, Ind., assignor to Barnes Motor Developments Company, Muncie, Ind., a partnership consisting of William B. Barnes and Freda Arthur Barnes Original application June 18, 1943, Serial No. 491,284. Divided and this application January 3, 1944, Serial No. 516,782

12 Claims. (Cl. 74—331)

The present invention relates to improvements in speed changing transmission gearing. More particularly, the invention relates to improvements in speed changing transmission applicable for driving a supercharger of a hydro-carbon engine or other power unit of that type used in operating an airplane. One of the objects of my invention is the provision of a speed changing gearing occupying a minimum of space and having a minimum of weight. More specifically, one of the objects of my invention is to provide a multi-speed drive wherein the various gears of the driving mechanism may be conveniently grouped and assembled to permit the shifting mechanism for establishing the different speed drives to be so arranged as not to occupy additional space other than that which would be normally occupied by the gears. To this end, the various driving and driven gears are so clustered that the shifting and clutching mechanism may extend axially through the gear clusters.

A further object of my invention is to provide a speed changing mechanism in which the gears are so constructed that when assembled they will assume the correct driving relationship and may be easily and readily assembled in their driving relationship.

Other objects and advantages of my invention will appear more fully in the appended specification and in the appended claims.

For the purpose of disclosing the invention, I have illustrated certain embodiments thereof in the accompanying drawings, in which Fig. 1 is a longitudinal section of the drive take-off from the driving element;

Figs. 4 and 5 are longitudinal sections showing more in detail the fluid control mechanism;

Figs. 6 and 7 are views similar to Figs. 4 and 5 showing the parts in a different shifted position;

Fig. 10 is a detail longitudinal section of the rear extension of the fluid control casing;

Fig. 11 is a rear end view of the transmission casing.

Fig. 12 is a sectional view on the line 12—12 of Fig. 4;

Fig. 13 is a longitudinal sectional view of a modification of the fluid pressure control, the end of the casing 17 having been broken off and shown below Fig. 13 and to the right of Fig. 14;

Fig. 14 is a view, more or less diagrammatic, of the type of clutch used in connection with my invention;

Fig. 15 is a schematic elevation showing the association of the parts relative to a supercharger and an airplane engine;

Fig. 16 is a continuation of the end of the casing.

Figure 1:
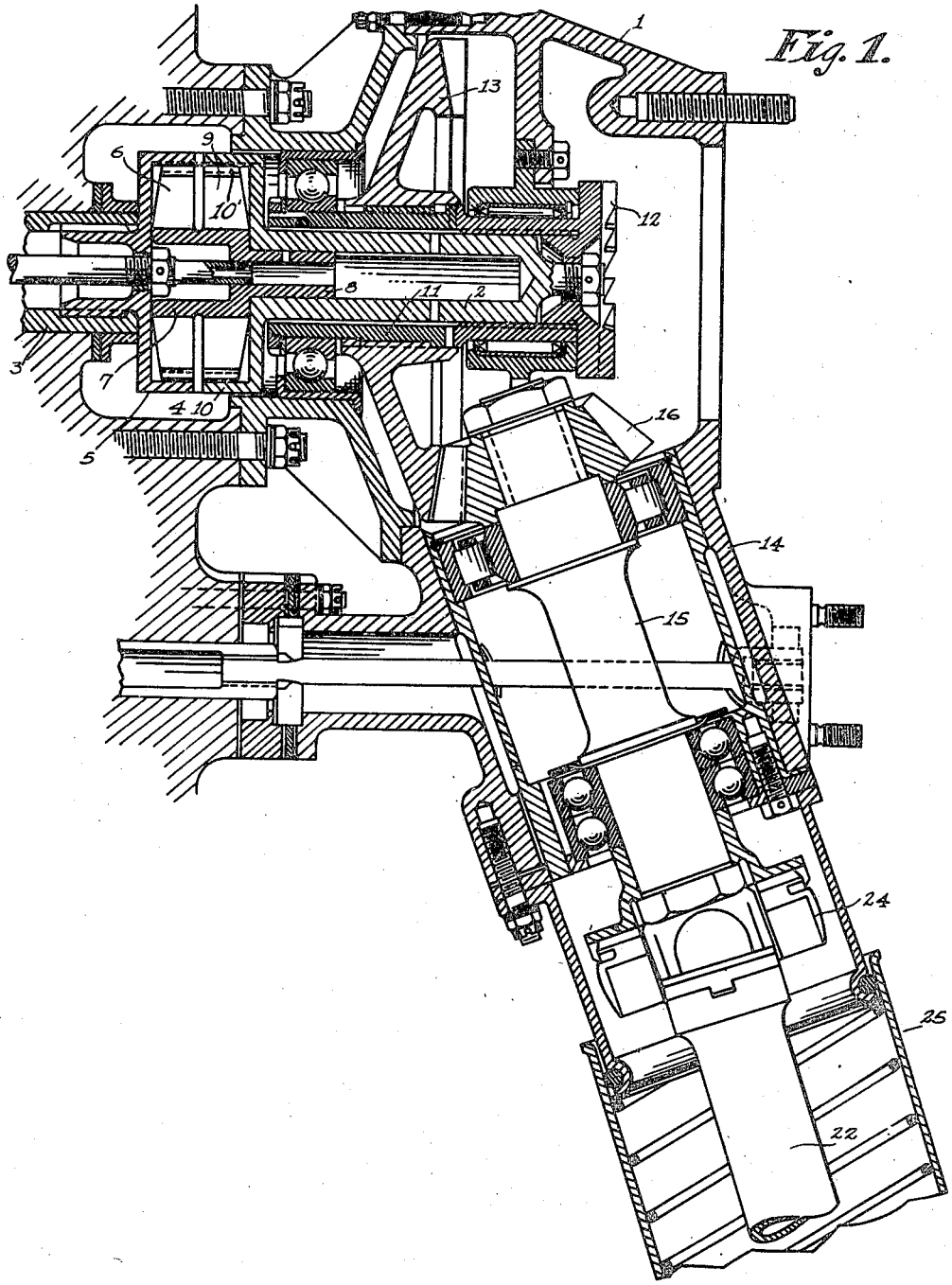

In the embodiment of the invention specifically illustrated for driving the supercharger for an engine for an airplane, the drive of the supercharger is taken from the crank shaft or other driving shaft of the engine, and to this end, the initial drive connection is made between the inertia starter clutch and the engine shaft. Accordingly, at the rear of the engine casing, I provide a casing 1 having mounted therein a shaft 2. The shaft, at one end, is connected to the crank shaft 3 of the engine through the medium of a coupling 4 comprising a housing 5 splined in the shaft 3. This housing has internal teeth 5' engaging a series of radial arms 6 preferably of flat spring material and radiating from a hub 7 having a reduced extension 8 rotatably mounted in the end of the hollow shaft 2. A similar set of arms 9 on the hub 7 engages internal teeth 10' in a housing 10 comprising an enlargement of the end of the shaft 2. A sleeve 11 surrounds the shaft 2 having a splined connection with the shaft and this sleeve, at its rear end, has connected thereto, through the medium of internal splines, a one-way clutch member 12 adapted for engagement by a clutch member of the inertia starter for the engine. This sleeve 11 has splined thereon a bevel gear 13 which is the driving element for the speed changing transmission.

A downwardly and rearwardly extending portion 14 of the casing supports a shaft 15 carrying a bevel pinion 16 meshing with the bevel gear 13. The shaft 15 forms part of a shaft coupling connecting the transmission with the driving gearing above described.

The casing 17 for the transmission includes an upwardly and forwardly projecting extension 18 in which is rotatably mounted a sleeve 19 having, at its lower end, a bevel gear 20.

Figure 3:
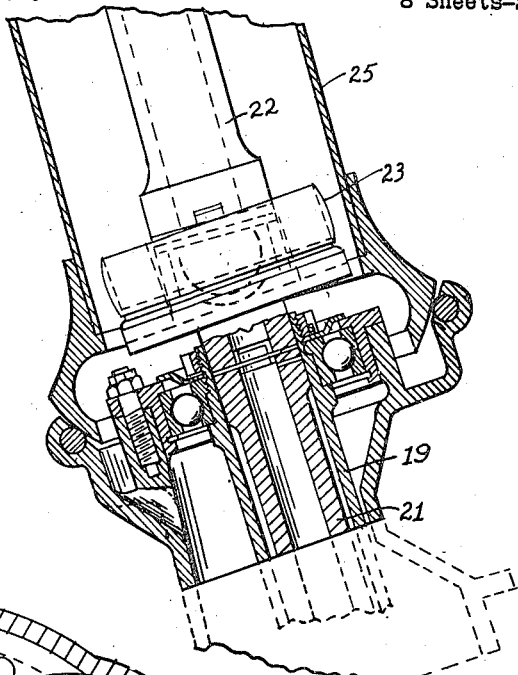
Fig. 3 is a longitudinal section of the intermediate portion of the drive between the drive take-off and the transmission.

The sleeve of the shaft has splined therein a hollow shaft 21 (see Fig. 3) which, at its upper end, is connected through a coupling shaft 22 having universal couplings 23 and 24 with the shaft 15, thus forming a driving connection between the engine and the transmission. A suitable casing 25 surrounds the drive shafts.

The speed changing transmission gearing which receives its drive from the bevel gear 20, comprises what may be termed a drive gear 26 and a plurality of driven gears 27, 28 and 29, and a secondary driven gear 30. The diameter of these respective gears 27, 28 and 29 decreases so that in the gearing combination each of the gears 27 to 29 will drive its driven part at an increased speed, while the diameter of the gear 30 is such that the speed of the drive through this gear will be at least equal to the speed of the drive of gear 29. The gears 27 to 29 are all arranged on a common axis and have an internal bore, the bore of all the gears being of the same diameter for a purpose more fully hereinafter to appear.

Surrounding the axis of the gears 27 to 30 is a series of countershafts 31, each of which carries a plurality of gears 32, 33, 34, 35 and 36, respectively meshing with the gears 26 to 30. Due to the disposal of the countershafts 31 and their respective gears about the gears 26 to 29, these gears are supported and against transverse movement relative to their axes and maintained in position about a common axis solely by their engagement with the countershaft gears, thereby dispensing with a supporting shaft for the driving gears. This permits the extension therethrough of suitable control mechanism to be more fully hereinafter described.

For driving the various connecting countershaft gears, the countershaft 31 is provided with a hollow sleeve 37 which has formed thereon the countershaft gear 32. This sleeve 37 has formed thereon, or splinedly connected thereto, a series of annular, substantially truncated, cone-shaped hubs 38 and the internal bore of the gears 33 and 36 are beveled to coincide with these hubs. When the gears are assembled on their cone-shaped hubs, they are forced into wedging position on these hubs through the medium of a nut 39 threaded on the end of sleeve 37 whereby, after the countershaft gears, which have been loosely mounted on their respective hubs, properly center their teeth in meshing engagement with the gears 27 to 30, the nut may be tightened, wedging the gears in their proper relationship on their hubs and thus securing the gears to the countershaft 37.

The hub 40 of the gear 26 has splined thereon a bevel gear 41 which meshes with, and is driven from, the bevel gear 20 and thus provides the driving gear of the speed changing transmission.

The gear 30 is formed on a hub or sleeve 30' which carries one member 42 of a fluid coupling. The other member 43 of this coupling is mounted on a hub 44 of the outer member 45 of an overrunning clutch, which outer member, in turn, is directly connected by toothed engagement with the driving shaft 46 of the supercharger. Thus, when the fluid coupling is energized, a drive is established from the gear 26 through the sleeve 37, the gears 30 and 36, and through the fluid coupling to the supercharger driving shaft 46.

The inner member 47 of the overrunning clutch, between which and the outer member 45, is provided engaging rollers 48, telescopes and is splined to a hollow shaft 49 which is adapted to be selectively driven from any one of the gears 26 to 29 at different speeds, to thereby drive the shaft 46 at various speeds through the overrunning clutch. The fluid under pressure is admitted to the fluid coupling from the hollow shaft 49 through an opening 50 in the shaft and this opening passes through internal axial splines in the shaft so that the inlet of the opening 50 extends inwardly beyond the inner periphery of the hollow shaft. The opening 50 communicates with suitable supply openings 52 with the interior of the fluid coupling and it is to be noted that this fluid coupling is provided with one or more bleed openings 53, the purpose of which will more fully hereinafter appear.

The hollow shaft 49 is provided with suitable oil outlets for the purpose of passing lubrication oil to various parts of the transmission and this oil is delivered from the hollow shaft 49 which, at all times, maintains a small amount of oil. Under normal circumstances, as the shaft rotates, this small amount of oil forms a film on the inner periphery of the shaft and, due to the axial splines 51, this film will not flow into the feed opening 50 and thus into the fluid coupling to have a tendency to energize the same. I am thus enabled to lubricate the parts through this hollow shaft without energizing the fluid coupling except when it is desired and under predetermined conditions.

The hollow shaft 49 is driven at different speeds through the medium of the gears 26 to 29, and the corresponding countershaft gears, from a hollow shaft 54 which, at its forward end, has an internal splined connection with the shaft 49 and which, at its rear end, is provided with an extension hollow sleeve 54. To effect this drive, the internal diameters of the gears 26 to 29 are respectively provided with clutch teeth 26', 27', and 28' and 29', which teeth are adapted to be selectively engaged by the clutch teeth 55 on an axially slidable member 56. The respective teeth 26' to 29' and the teeth 55 are of the type which will engage only when the two clutching members are rotating substantially at synchronism. One type of clutch which may be advantageously used in this connection is that which has become commercially known as the Maybach as illustrated in Fig. 14.

This clutch member 56 axially moves on, and is splinedly connected with, the sleeve 54 so that, as the sleeve 54 is rotated with the hollow shaft 54', the clutch teeth 55 are likewise rotated and thus, when the clutch teeth 55 are engaged with any one of the sets of teeth 26' to 29', the shaft 54' will be driven, and, through it, will drive the hollow shaft 49, thus, through the overrunning clutch, driving the driven shaft 46. Therefore, when the clutch teeth 55 are in engagement with the clutch teeth 26' of the gear 26 a direct drive is effected from the hub 40 of this gear 26 to the driven shaft 46. When the teeth 55 are in engagement with the teeth 27' of the gear 27, a drive will be effected from the gear 26 through the countershaft gears 32, the countershaft gear 33, and the next higher speed gear 28, and thence to the shaft 54', thus driving the shaft 46 at a higher speed than that which would be effective with the direct drive. Progressively, the clutch teeth 55 may engage the teeth 28' and 29' to step the speed up still further.

Due to the fact that the speeds of the respective gears 27, 28 and 29 are higher, it is necessary, in order that clutch teeth 55 may engage the clutch teeth of the next higher gear, that the two sets of clutch teeth attain substantial synchronism, and also, to permit the easy shifting of the clutch member 56, relieve the load between the clutch teeth 55 and the teeth with which it is engaged. In order to obtain this result, immediately before, or substantially at, the time of shift of the clutch teeth 55, the fluid coupling is energized by the admission of suitable oil to the interior thereof.

As has heretofore been pointed out, the driving member 42 of this fluid coupling is driven from the gear 30, the speed of which is at least as great as gear 29 and greater than any of the other gears 27 and 28 and, therefore, as soon as the fluid coupling becomes energized by the admission of oil thereto, the load will be picked up by this drive through gear 30 and a drive will be effected through the fluid coupling to the shaft 49 rather than through the clutch 55. As a result of this drive, the shaft 49, through the frictional drag of the overrunning clutch and through the ratcheting of the two relatively moving sets of teeth, has its speed accelerated and, as the load is relieved from the clutch, the engaging clutch teeth 55 will be accelerated until their speed is substantially in synchronism with the teeth to be engaged. The clutch will therefore engage to again drive the shaft 46 through the overrunning clutch. Likewise, when it is desired to move from a higher speed into a lower speed, the fluid coupling is again energized for relieving the load from the engaged clutch teeth. Under these circumstances, the clutch teeth 55, due to their ratcheting on the slower speed clutch teeth, will have their speed gradually reduced until the two sets of teeth are in synchronism and be engaged.

It must be remembered that with the drive through the fluid coupling, the only drive effected to the shaft 49 and to the clutch teeth 55 is as a result of the drag of this overrunning clutch and this drag would be readily overcome by the ratcheting of the sets of teeth so that the respective speeds of the clutch teeth will become quickly synchronized.

The sleeves 54 and 56 are rotatably connected by axially spaced splined couplings 60 and 61. Between the couplings 60 and 61 is mounted a coiled spring 66. The sleeve 54 extends into a cylinder 57 arranged within an extension 58 of the casing. A piston 59 mounted upon the sleeve 54 is adapted to move the sleeve 54 axially and through it, by the spring 66, shift the clutch sleeve 56 to engage and disengage the clutch teeth 55.

The operation of the piston 59 also controls the admission of oil to the fluid coupling.

In operation assuming that the piston 59 is moved to the left (Figs. 6 and 7) the sleeve 54 will be moved to the left. The external splines 62 of couplings 60, bearing on the rear end of the spring 66, will compress this spring. The forward end of the compressed spring bearing on the internal splines 64 of the coupling 61, which internal splines are on sleeve 56, will bias the sleeve 56 to the left. This provides a bias to engage the clutch teeth 55 with the clutch teeth of the gears when the two sets of gears approach synchonism. In a reverse movement of the sleeve 54 the external splines of coupling 61, which are on sleeve 54 will compress the spring 66 in the opposite direction and the opposite end of spring 66 will exert a bias on the internal teeth of coupling 60, which teeth are on sleeve 56. This will tend to move the sleeve 56 to the right.

This piston 59 is a composite structure. As a part of this piston there is provided a piston shell 67 having, at one end, an inturned annular shoulder 68 and receiving, at the other end, a flange 69 of a housing 70. Arranged within the piston shell 67 is a hub 71 having, at each end, annular flanges 72 and 73. This hub is fixed on the sleeve 54, one end abutting against a shoulder on the sleeve and the other abutting against a threaded nut 74. Surrounding the hub and within the cylinder 57 is a pair of annular pistons 75 and 76 spaced apart and biased in their spaced relation through the medium of coiled springs 77. The housing 70 surrounds and is secured to a hollow extension 78 of a hollow tube 79 arranged within the sleeve 54 and extending forwardly to be supported by a suitable splined support 80 within the hollow shaft 49. This extension 78 is arranged within an extension 81, Fig. 10, of the transmission casing but does not communicate directly with the hollow tube 79. Due to the connection between the housing 70 and the tube extension 78, the tube, of course, will be moved whenever the piston 59 as a whole is moved.

Fluid pressure is admitted to the cylinder 57 from a suitable fluid pressure pump 82 which may be of any desired structure and which supplies fluid under pressure to an annular chamber 83 communicating with the forward end of the cylinder 57 through restricted openings 84. This annular chamber 83 also supplies fluid under pressure to a conduit or passageway 85 which communicates through a suitable restricted opening 86 with the cylinder 57 on the opposite side of the piston 59. Therefore, under normal circumstances, the cylinder 57 is supplied with fluid under pressure on each side of the piston 59, which pressure being the same no movement would be occasioned by the fluid within the cylinder 57. The escape of the fluid from the cylinder, on either side of the piston 59, is controlled by a rotary valve 87 having suitable ports 88 therein, which ports are adapted to communicate with vent openings 89 in the cylinder 57. Fluid under pressure is also admitted to the extension 78 by an extension of the conduit 90 which communicates with a port 91 in the casing extension 81. The hollow tube 79 is provided with spaced ports 92 and 93 which are controlled by ports 94 and 95 in the hub 71.

Figure 2:
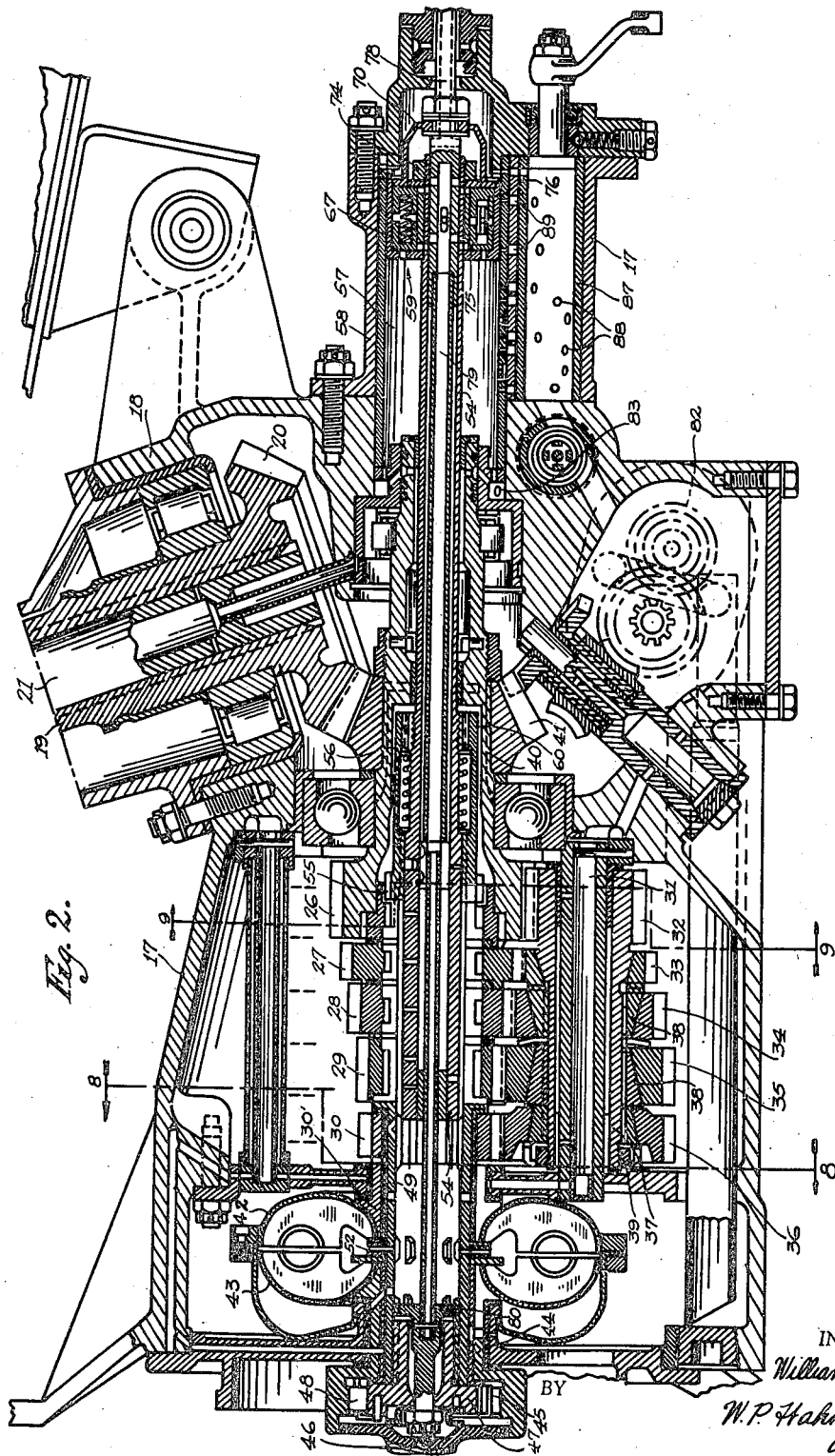
Fig. 2 is a longitudinal section of the speed changing transmission.

In operation, we will assume that the parts are in the position illustrated in Fig. 2 and that no drive is taking place. If the operator desires to effect an initial drive, which will be what may be termed a low-speed drive, the valve 87 is rotated to a position wherein a vent 89 at the left of the cylinder 57 is opened. Under these circumstances the pressure on the lefthand side of the piston will be reduced, thus creating a preponderance of pressure on the right hand side. Therefore the housing 70, and with it its piston valve 76, will be moved to the left with the flange 69 engaging the piston valve 76, moving this piston valve to the left against the bias of the spring 77 until this piston valve 76 abuts the piston valve 75. During this movement it is to be observed that the tube 79 is likewise moved to the left. With this movement to the left, locking pin 96, which is normally in the recess 97 in the sleeve 56, is released, being permitted to drop in a recess 98 in the tube 79, Fig. 5. By the time the valve piston 76 is collapsed against the valve piston 75, the ports 92 and 94 are placed in communication and fluid pressure flowing into the end of the tube extension 78 will pass out through ports 94 and through 92 into the tube 79 flowing forward in the tube and out through the ports 100 into the hollow shaft 49 where it is adapted to flow into the fluid coupling.

Figure 8:
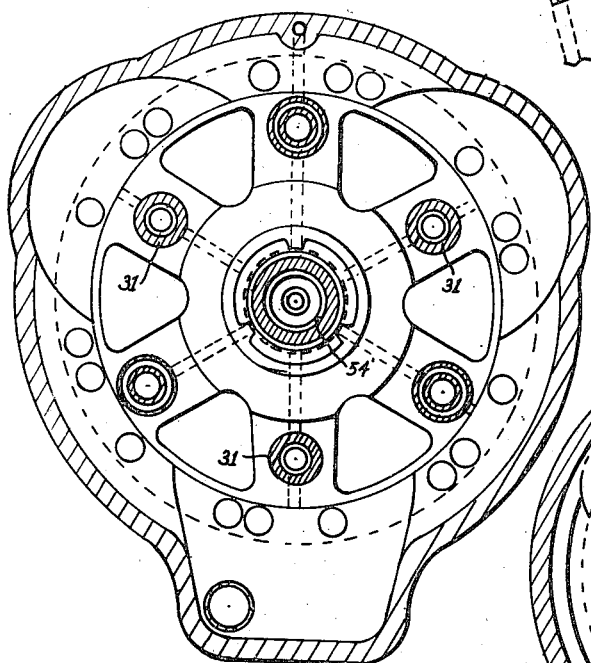
Fig. 8 is a transverse section on the line 8—8 of Fig. 2.
Figure 9:
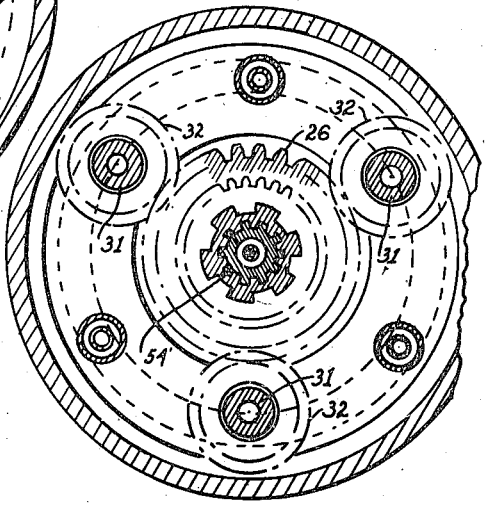
Fig. 9 is a transverse section on the line 9—9 of Fig. 2.

Due to the fact that the pin 96 is dropped into the recess 98, the sleeve 56 will be released or unlocked and with the valve piston 76 abutting the valve piston 75 which, in turn, abuts the flange 68, the sleeve 54 will be forced axially to the left moving the teeth 55 against the teeth 26'. At this time, however, the teeth 26' and the teeth 55 have a different relative rotation speed so that the teeth cannot engage. Therefore the sleeve 56 will not be moved further, although the sleeve 54 continues its axial movement placing the spring 66 under compression. The parts are then in the position illustrated in Figs. 7 and 8. It must be borne in mind, however, that during this operation, fluid pressure is being admitted to the fluid coupling which thus becomes energized and drives the shaft 46. At the same time, through the friction drag of the parts, the teeth 55 will commence to pick up speed, and when they approach, or approximately approach, synchronism the teeth 55 will slip into engagement with the teeth 26', thus establishing the initial or low speed drive. By the time this has been effected, the piston shell 67 will have been moved far enough to the left to uncover a vent opening to the right of the piston cylinder so that fluid under pressure will escape from the cylinder 57 at the right hand side of the piston 59 thus equalizing the pressures on the right and left hand side of the piston. The control ports are spaced apart in such a manner that the two vent ports are slightly overlapped by the ends of the piston shell 67 so that eventually the pressures on each side of the piston 59 will again come to balance and the piston come to rest. By having a slight continuous vent from the opposite side of the piston 59 a hunting of the pistons will be prevented. By the time the clutch teeth have become engaged and the movement of the cylinder has ceased, the expansion of the spring 77 against piston valve 75 and the flange 72 will tend to move sleeve 54 relatively to the tube to move parts 92 and 94 out of alignment shutting off the supply of oil to the fluid coupling and with the supply of fluid shut off, the oil will bleed through the opening 53 and the fluid coupling will be deenergized thus releasing the drive to the gearing.

In Fig. 13, I have illustrated a modification of the valving arrangement for controlling the admission of energizing fluid to the fluid coupling. In the structure illustrated in this figure, the supply of fluid to the fluid coupling is divorced from the supply of fluid for operating the piston 59. Therefore, the tube 79 is made continuous having its inlet end at the rear end of the casing extension 81 and this casing extension is supplied with fluid under pressure from the pump by a conduit independent of that supplying the fluid to the cylinder 57. The forward end of the tube 79 is provided with an outlet port 100. Furthermore, there are no ports provided in the piston 59 for admission of fluid under pressure from the cylinder 57 to a tube 79. In operation, when a preponderance of fluid pressure is exerted on the right hand side of piston 59, the axial movement of this piston to the left will carry the entire tube 79 forward, therefore projecting the end of the tube beyond the shaft 54', opening the ports 100 and thus permitting the fluid coupling fluid to flow into the hollow shaft 49. The movement of the respective parts of the piston for effecting the engagement of the clutch member of the clutch teeth 55 is the same as heretofore described.

Obviously, when the speed is stepped down from a higher speed drive to a lower speed drive, the initial axial movement of the tube 79 will be to the right therefore placing the ports 100 in communication with the ports 101 in the end of the shaft 54 thus permitting the flow of fluid to the fluid coupling to energize the same.

In Fig. 15 I have illustrated an application of my invention to the drive of a supercharger for an airplane engine. As shown in this figure, the engine 102 has the casing 1 mounted at its rear. The supercharger 103 is arranged below the engine and has the casing 17 connected therewith while a suitable conduit 104 leads from the supercharger to the engine intake system.

The present application is a division of my copending application Serial No. 491,284 for Automatic speed changing transmission, filed June 18, 1943.

I claim as my invention:

1. In a speed changing transmission, in combination, speed changing gearing including a plurality of speed changing gears axially aligned and having a center bore therethrough, a plurality of countershafts disposed about the axis of said gears and having formed thereon axially disposed cone shaped wedges, a plurality of countershaft gears carried by said countershafts each of said gears having an internal bore corresponding to one of said cone shaped wedges, and means for forcing said wedges into said cone shaped bores for locking the gears to the countershaft, said countershaft gears comprising the sole support for said speed changing gears against transverse movement relative to their axes.

2. In a speed changing transmission, in combination, a casing, speed changing gearing including a plurality of speed changing gears mounted within said casing, axially aligned and having a center bore, a plurality of fixed countershafts mounted within said casing and disposed about the axis of said gears, countershaft gears carried by said countershafts and meshing with said axially aligned gears and constituting the sole support for said gears against transverse movement relative to their axes, a driven member extending through said bores, means for selectively connecting said driven member with said axially aligned gears and a driving gear for said countershafts axially aligned with said axially aligned gears and having a central bore receiving said driven member.

3. In a speed changing transmission, in combination, a casing, speed changing gearing including a plurality of speed changing gears mounted within said casing, axially aligned and each having a center bore, a plurality of fixed countershafts mounted within said casing and disposed about the axis of said gears, countershaft gears meshing with said axially aligned gears and constituting the sole support for said gears against transverse movement relative to their axes, a driven member extending through said bores, means for selectively connecting said axially aligned gears with said driven member, a driven shaft, a driving gear for said countershafts, a secondary gear driven from said countershafts axially aligned with said speed changing gears and having a center bore receiving said driven member.

4. In a speed changing transmission, in combination, speed changing gearing including a plurality of speed changing gears axially aligned and each having a center bore extending therethrough, a plurality of fixed countershafts disposed about the axis of said speed changing gears, a countershaft gear on each of said countershafts, for each of said speed changing gears drivingly meshing with its meshing speed changing gear, said countershaft gears providing the sole support for said speed changing gears against transverse movement relative to their axes, as a result of said meshing engagement, and maintaining said speed changing gears in axial alignment through said meshing engagement, a driven member extending through the aligned bores of said speed changing gears, and means for selectively connecting said speed changing gears with said driven members.

5. In a speed changing transmission, in combination, a driving gear, speed changing gearing including a plurality of fixed countershafts surrounding the axis of said driving gear, a plurality of countershaft gears on each of said countershafts, and driven from said driving gear, a plurality of speed changing gears in axial alignment with the driving gear, and each having a center bore extending therethrough, a countershaft gear on each of said countershafts drivingly meshing with each of said speed changing gears and constituting a sole support for said speed changing gear against transverse movement relative to their axes and maintaining the same against axial displacement, a driven member extending through the center bores of said speed changing gears, and means for selectively connecting said speed changing gears with said driven member.

6. In a speed changing transmission, in combination, speed changing gearing including a plurality of speed changing gears axially aligned and each having a center bore extending therethrough, a plurality of fixed countershafts disposed about the axis of said speed changing gears, a countershaft gear on each of said countershafts for each of said speed changing gears, drivingly meshing with its corresponding gear and constituting the sole support of said speed changing gear against transverse movement relative to their axes, as a result of said meshing engagement and maintaining said speed changing gear in axial alignment, a driven member extending through the bores of said speed changing gears, and fluid pressure operated means for selectively connecting said speed changing gears with said driven member.

7. In a speed changing transmission, in combination, speed changing gearing including a plurality of speed changing gears axially aligned and each having a center bore extending therethrough, a plurality of countershafts disposed about the axis of said speed changing gears, a countershaft gear on each of said countershafts for each of said speed changing gears, drivingly meshing with its corresponding gear, said countershaft gears providing the sole support of said speed changing gears against transverse movement relative to their axes, as a result of said meshing engagement and maintaining said speed changing gears in axial alignment, a driven member extending through the hollow bores of said speed changing gears, each of said speed changing gears having within its hollow bore clutch teeth and axially shiftable clutch means drivingly connected with said driven member and selectively shiftable into engagement with the clutch teeth of said speed changing gears, and fluid pressure means for selectively shifting said shiftable clutch member.

8. In a speed changing transmission, in combination, speed changing gearing including a plurality of speed changing gears axially aligned and each having a center bore extending therethrough, a plurality of fixed countershafts disposed about the axis of said speed changing gears, a countershaft gear on each of said countershafts for each of said speed changing gears, drivingly meshing with its corresponding gear, said countershaft providing the sole support of said speed changing gear against transverse movement relative to their axes, as a result of said meshing engagement and maintaining said speed changing gears in axial alignment, a driven member extending through the bores of said speed changing gears, each of said speed changing gears having clutch teeth within its hollow bore, a clutch member drivingly connected with said driven member, means for biasing said clutch member into engagement with and disengagement from the clutch teeth of said speed changing gears, and fluid pressure means for activating said biasing means to engage or disengage said clutch members.

9. In a speed changing transmission in combination a casing, speed changing gearing including a plurality of speed changing gears mounted within said casing, axially aligned, and each having a center bore therethrough, a driven member adapted to drive a driven shaft extending through the center bores of said gears, a plurality of fixed countershafts in said casing and disposed about the axes of said gears, countershaft gears meshing with said axially aligned gears and forming the sole support for said speed changing gears against transverse movement relative to their axes and means for selectively connecting said axially aligned gears with said driven member.

10. In a speed changing transmission, in combination, a casing speed changing gearing including a plurality of axially aligned gears each having a bore extending therethrough and mounted in said casing, a driving gear in axial alignment with said speed changing gears, a plurality of fixed countershafts surrounding said speed changing gears, mounted within said casing, countershaft gears meshing with said speed changing gears and providing the sole support for said speed changing gears against transverse movement relative to their axes, a driven member adapted to drive a driven shaft and extending through the hollow bores of said driving gear and said speed changing gears, and means for selectively connecting said speed changing gears with said driven shaft.

11. In a speed changing transmission, in combination a casing, speed changing gearing including a plurality of axially aligned speed changing gears mounted within said casing, each having a center bore extending therethrough a driving gear having a hollow bore, a plurality of countershafts surrounding said speed changing gears and said driving gear mounted within said casing, countershaft gears meshing with said driving gear and with said speed changing gears and providing the sole support for said speed changing gears against transverse movement relative to their axes, a driven member adapted to drive a driven shaft, and means for selectively connecting any one of said speed changing gears with said driven member.

12. In a speed changing transmission, in combination, a casing, speed changing gearing including a plurality of speed changing gears mounted within said casing arranged in axial alignment and each having a hollow bore extending therethrough, a plurality of fixed countershafts mounted within said casing surrounding said gears and having countershaft gears engaging said speed changing gears and forming the sole support therefor against transverse movement relative to their axes, each of said speed changing gears having, on the inner walls thereof, inwardly projecting clutch teeth, a driven member extending through said hollow bores and adapted to drive a driven shaft, and an axially movable clutch member connected with said driven member and selectively moveable into engagement with the clutch teeth of said speed changing gears.

WILLIAM B. BARNES.

REFERENCES CITED

The following references are of record in the file of this patent:

UNITED STATES PATENTS

| Number | Name | Date |
|---|---|---|
| 1,326,281 | Miller | Dec. 30, 1919 |
| 1,884,595 | Moxley | Oct. 25, 1932 |
| 1,901,193 | Salerni | Mar. 14, 1933 |
| 2,091,637 | Hoffman et al. | Aug. 31, 1937 |
| 2,095,794 | Corbin | Oct. 12, 1937 |
| 2,323,601 | Hobbs | July 6, 1943 |

FOREIGN PATENTS

| Number | Country | Date |
|---|---|---|
| 628,302 | Germany | Feb. 29, 1936 |